3,324,083
PROCESS FOR CONTROLLING THE DEGREE OF POLYMERIZATION OF POLYOXYMETHYLENES
Hans von Portatius, Marl, Germany, assignor to Chemishe Werke Hüls Aktiengesellschaft, Marl, Germany
No Drawing. Filed Dec. 15, 1964, Ser. No. 418,530
Claims priority, application Germany, Dec. 31, 1963, C 31,793
2 Claims. (Cl. 260—67)

This application relates to a process for controlling the degree of polymerization of polyoxymethylenes generally and the polymerization of monomeric formaldehyde particularly.

It is an object of the present invention to produce polyoxymethylenes of a predetermined molecular weight by direct polymerization.

It is a further object of the present invention to provide mixed catalysts selected from the group consisting of aliphatic tertiary amines, cycloaliphatic tertiary amines and pyridine with another amine selected from the group consisting of aliphatic primary amines, aliphatic secondary amines, cycloaliphatic primary amines, and cycloaliphatic secondary amines in the polymerization of polyoxymethylenes.

A further object of the invention is to produce polymers with controlled physical and chemical properties by direct polymerization.

Further objects of the invention will be obvious from the disclosure and examples throughout the specification.

The mechanical properties of polymers, such as the impact strength, flexibility, hardness etc., are known to change with the degree of polymerization. In order to obtain optimum mechanical properties, it is often considered important to have the degree of polymerization as high as possible. In the case of polyoxymethylene, with increasing polymerization the liquid viscosity increases to such an extent that limits are imposed on the workability of the material. Efforts have been made to continue the polymerization only to an extent that is consistent with the intended use of the material.

It is possible to arrive at a desired viscosity by mixing a polyoxymethylene of higher viscosity with one of lower viscosity until the desired intermediate viscosity is reached. Such a mixture usually possesses mainly the undesirable mechanical properties of the material of lower viscosity.

It is indeed possible, as taught by the German printed specification 1,126,137, to reduce the average chain length of the polyoxymethylene molecule by treating it with acids in the presence of etherizing agents. It is, however, advantageous for various reasons to take appropriate measures during the preparation of the polyoxymethylene to produce products of certain intermediate degrees of polymerization.

Such processes have already been suggested. According to U.S. Patent 3,017,389, in addition to an initiator, amine- and phenol-free chain transfer agents of various chemical structures, while according to British Patent 796,862, mixtures of water, methanol and formic acid are used.

These processes require the addition of undesirable ingredients to the polymerizing substances.

It has been found that polyoxymethylenes with definite degrees of polymerization can be produced by the introduction of pure formaldehyde in a catalyst containing indifferent solvent if the catalyst used comprises a mixture of a tertiary amine selected from the group consisting of aliphatic tertiary amines, cycloaliphatic tertiary amines and pyridine with another amine selected from the group consisting of aliphatic primary amines, aliphatic secondary amines cycloaliphatic primary amines, and cycloaliphatic secondary amines.

Suitable tertiary amines are, for example—
(A) trimethylamine, triethylamine, tri-n-butylamine, tri-i-amylamine, tri-n-octylamine, 1,3-bis-(dimethylamino) propane, pyridine, the piperidine salt of dimethyldithio-carbamic acid, triethanolamine, hexamethylenetetramine, tetra-methylene-diamine, tetraethyl-methylenediamine, and N-dimethyl-N'-diethyl-ethylene-diamine.

As secondary amines, use can be made of—
(B) piperidine, dimethylamine, diethylamine, dipropylamine, piperazine, dibutylamine, diethanolamine, N,N'-dimethyl-ethylene-diamine, N,N'-dihexyl-octane diamine, and N-ethyl-N'-octyl-decane-diamine.

Besides or instead of the secondary amines, primary amines can be used, such as—
(C) methylamine, ethylamine, propylamine, butylamine, cyclohexylamine, ethylene - diamine, sec.butylamine, tert. butylamine, monoethanolamine, hexane-diamine-(1,6) and propane-diamine-(1,3).

The selected amines can be dissolved (suspended or emulsified), in an inert solvent, and monomeric formaldehyde then introduced with constant stirring. The formaldehyde should not contain more than 40-80 p.p.m. water, 300 p.p.m. methanol, 30 p.p.m. methylal, 10 p.p.m. formic acid or 20 to 50 p.p.m. methyl formate as impurities. Polymerization commences as soon as the formaldehyde is introduced. The polymer separates out and can be removed.

Any organic liquid can be used as a solvent, provided it is chemically inert toward monomeric formaldehyde and under normal conditions will not dissolve more than 3% of the monomer, preferably not more than 2%, and in particular cases not more than 1%. Suitable solvents are aliphatic hydrocarbons with more than three carbon atoms, for example, butane, pentane, isohexane, iso-octane, dodecane, eicosane, benzene. Diesel oil and its fractions, melted paraffin wax, cyclo-paraffins such as cyclobutane, cyclohexane and cyclododecane, and mixtures of the above substances with one another and with aromatic substances such as benzene, toluene or xylene where the aromatic components are not present in more than 50% by weight.

The concentration of amine in the solvent may vary from 0.004 to 0.8% by weight.

The polymerization temperature can vary within wide limits between −100° C. and +90° C., but for reasons of economy it is best to work between −20° C. and +60° C.

There is practically no limit to the number of different amine mixtures that can be used, provided that for initiating the formaldehyde polymerization use is always made of a trisubstituted nitrogen atom together with one or more compounds containing a disubstituted or monosubstituted nitrogen atom.

Suitable combinations are, e.g.:
Triethylamine/piperdine
Tributylamine/butylamine
Pyridine/dibutylamine
Tri-n-octylamine/piperidine
Tri-n-butylamine/di-n-butylamine
Triethylamine/ethylene diamino
Triethylamine/piperidine
Pyridine/piperidine
Pyridine/cyclohexylamine
Triethylamine/diethylamine It has been shown that a tertiary amine when used as the sole catalyst will produce copolymers with high degrees of polymerization which are generally not of technical value. Secondary and primary amines generally produce polyoxymethylenes with only low degrees of polymerization which are brittle.

Technically useful resins are preferably produced by the method of this invention with about equimolar mixtures of a tertiary amine on the one hand, and a secondary or primary amine on the other hand. It is, however, permissible to select any other desired combination. If, for example, it is desired to obtain a very high melecular weight while still remaining in the region of workability, it will be advisable to use a high proportion of tertiary amines in an equivalent mixture. If, however, it is desired to produce a readily fusible polymer which is not as brittle as one that would be produced by the use of a primary or secondary amine alone, then this can be done by the addition of some tertiary amine in less than equimolar amount.

It has been found unexpectedly that the resulting molecular weights of the polymers do not bear any linear relationship to the molar proportions of the selected amines, or to the limiting molecular weights which can be obtained by the various amines when used separately. The molecular weights obtained with different amine mixtures do not follow any simple function but depend on the particular amine mixture and the ratio of tertiary amine to primary or secondary amine.

The amines can be used in amounts of 0.0001 to 0.5 molar percent, preferably 0.01 to 0.3 molar percent, and especially 0.05 molar percent of the formaldehyde that is introduced.

The molar ratio of tertiary amine group to primary and/or secondary amine group may vary from 1 to 3, depending on the polymer properties desired.

The chosen polymerization temperature can vary within wide limits and in the present process has no appreciable effect on the chain lengths that are produced.

This new process has many advantages. The necessary technical operations are greatly simplified by elimination of the necessity for continual additions of chain breakers and analytic control of the degree of polymerization of the product. The process also eliminates the necessity of purifying the solvent which sometimes had to be done after each use, but which is now unnecessary because no polar substances are now used as molecular weight regulators. Since these polar substances did not all remain in the polymers, portions thereof would accumulate in the solvent. The new process permits changing over to other molecular weights without a complete change of procedure and apparatus where it is only necessary to change the composition of the initiation mixture as by adding amines as initiators. Since the same amines can be used for subsequent polymerizations, it will not be necessary to remove them from the solvent between successive uses. The same amines will also serve as catalysts for the addition of the terminal groups to the polymers.

It has been especially surprising that the polyoxymethylenes produced by this process are not, as might be expected, mixtures of high and low polymers depending on the composition of the added amines, but rather products which have more nearly uniform molecular weights. This characteristic is very important to the practical usefulness of the resulting products.

The use of amine mixtures for formaldehyde polymerization has been suggested heretofore, but generally with reference to only tertiary amines. The secondary amines which were present were evidently considered as being only impurities with no effect on molecular weight regulation. Although the use of diphenylamine has been described, it was used only as an oxidation inhibitor and being only slightly basic, it would not appear to be suitable as a polymerization initiator but would separate out.

Mixtures of the kind that are claimed herein have not been previously suggested. It has not been known in what manner the effect of tertiary amines is different from the effect of secondary and primary amines. It could not have been foreseen that mixtures of such amines would be useful for controlled molecular weight regulation. It is especially significant that there is generally no linear relation between the molecular weight of the polymer and amines that are used, and the nearly uniform molecular weight of each product is especially important.

Without further elaboration, it is believed that one skilled in the art can, using the preceding description, utilize the present invention to its fullest extent. The following preferred specific embodiments are, therefore, to be construed as merely illustrative, and no limitative of the remainder of the specification and claims in any way whatsoever.

*Example 1.*

600 g. commercial paraformaldehyde, 270 g. phosphorus pentoxide and 750 ml. paraffin oil are thermally reacted 3 hours at 85 to 130° C. under stirring and exclusion of oxygen. The resulting pyrolysis gases are delivered through a vertical Dimroth cooler to a cooling system consisting of three cooling systems kept at temperatures of $-30°$ C., and $-60°$ C. In the first and second cooling stages there occurs an extensive purification of the monomeric formaldehyde by prepolymerization, in the third cooling stage the monomeric formaldehyde is maintained as a water clear liquid. The formaldehyde is 99.9% pure.

In the course of one hour 7 mol formaldehyde are delivered to a reaction vessel containing 4000 ml. of a hexane fraction as well as the catalyst or the catalyst mixture in the concentration shown in Table I. The mix-

TABLE I

[Molecular weight standardization by catalyst initiator combination of tertiary with secondary and/or primary amines]

| Catalyst No. | Catalyst or Catalyst mixture | Catalyst Proportion, Mol percent | Yield, percent | Relative Viscosity, $\eta_r$ | Moulded plate |
|---|---|---|---|---|---|
| 1(a) | Triethylamine | 0.2/0 | 95 | 2.4 | Hard, elastic. |
| 1(b) | Piperidine | 0.2/0 | 88 | 0.64 | Soft, brittle and vesicular. |
| 1(c) | Triethylamine/piperidine | 0.1/0.1 | 100 | 0.90 | Elastic, hard. |
| 2(a) | Tri-n-butylamine | 0.2/0 | 93 | 2.5 | Hard, elastic. |
| 2(b) | Dibutylamine | 0.2/0 | 96 | 0.63 | Breaks after bending twice through 180°. |
| 2(c) | Tri-n-butylamine/dibutylamine | 0.1/0.1 | 97 | 1.1 | Elastic. |
| 3(a) | Tri-n-butylamine | 0.2/0 | 93 | 2.5 | |
| 3(b) | n-Butylamine | 0.2/0 | 73 | 0.50 | Very brittle. |
| 3(c) | Tri-n-butylamine/butylamine | 0.1/0.1 | 85 | 0.86 | Elastic. |
| 4(a) | Pyridine | 0.2/0 | 90 | 1.80 | Do. |
| 4(b) | Dibutylamine | 0.2/0 | 96 | 0.63 | |
| 4(c) | Pyridine/dibutylamine | 0.1/0.1 | 100 | 1.1 | Elastic |
| 5(a) | Piperidine salt of dimethyl-dithiocarbamic acid | 0.2/0 | 93 | 2.4 | Very hard. |
| 5(b) | Piperidine | 0.2/0 | 88 | 0.64 | Brittle. |
| 5(c) | Piperidine salt of dimethyl-dithiocarbamic acid/piperidine. | 0.1/0.1 | 100 | 1.4 | Elastic, hard. |
| 6(a) | Tri-n-octylamine | 0.2/0 | 89 | 2.9 | Hard and somewhat brittle. |
| 6(b) | Piperidine | 0.2/0 | 88 | 0.64 | Brittle. |
| 6(c) | Tri-n-octylamine/piperidine | 0.1/0.1 | 96 | 0.97 | Very elastic. |
| 7(a) | Triethylamine | 0.2/0 | 95 | 2.4 | Hard, elastic. |
| 7(b) | Dibutylamine | 0.2/0 | 96 | 0.63 | Brittle. |
| 7(c) | Butylamine | 0.2/0 | 73 | 0.50 | Very brittle. |
| 7(d) | Triethylamine/dibutylamine/n-butylamine | 0.1/0.05/0.05 | 96 | 1.1 | Elastic. | ture is actively stirred during polymerization while the temperature is kept at 20° C. by cooling. The polymer particles that are produced are filtered off with suction, washed several times with hexane and dried under vacuum at +60° C. The yield is then determined, and the viscosity measured at 135° C. with an Ostwald viscosimeter under nitrogen with a 0.25% solution of polyformaldehyde in dimethylformamide with an addition of 2% diphenylamine. The method of determining viscosity and the relationship with the molecular weight is disclosed in T. A. Koch and P. E. Lindvig, J. applied Polymer Science, vol. 1, No. 2, p. 167, Fig. 5 (1959).

*Example 2*

660 g. industrial paraformaldehyde are reacted with 270 g. phosphorus pentoxide and 750 ml. paraffin oil 3 hours at 85–130° C. with stirring and exclusion of oxygen. The resulting pyrolysis gases are purified as described under Example 1.

Seven mol of the formaldehyde thus purified are delivered to a reaction vessel containing 4000 ml. of a hexane fraction and the catalyst system in varying proportions. The results are tabulated as follows.

TABLE II
[Molecular weight regulation by variation of the molar proportions with fixed initiator combination]

| No. | Catalyst | Mol percent relative to monomeric formaldehyde | Yield, percent | Relative viscosity, $\eta_r$ |
|---|---|---|---|---|
| 1(a) | Triethylamine/piperidine | 0.1/0.1 | 100 | 0.90 |
| 1(b) | ____do____ | 0.1/0.05 | 100 | 1.4 |
| 2(a) | Tri-n-butylamine/n-butylamine | 0.1/0.1 | 85 | 0.86 |
| 2(b) | ____do____ | 0.15/0.05 | 86 | 1.8 |
| 3(a) | Triethylamine/dibutylamine | 0.1/0.1 | 97 | 0.90 |
| 3(b) | ____do____ | 0.1/0.05 | 95 | 1.5 |

*Example 3*

600 g. industrial paraformaldehyde are reacted with 270 g. phosphorus pentoxide and paraffin oil 3 hours at 85–130° C. with stirring and exclusion of oxygen. The resulting pyrolysis gases are purified as under Example 1.

Seven mol of the formaldehyde thus purified are delivered to a reaction vessel containing 4000 mol of a hexane fraction and an amine mixture containing a tertiary and a secondary amine in the ratio of 1:1, whereby the initiator concentration but not the ratio of tertiary to secondary amine is changed. As the following table shows, the resulting molecular weight is practically independent of the catalyst concentration, but does depend on the ratio of the di- to tri-substituted nitrogen.

TABLE III
[Variation of the initiator concentration with a constant ratio of tert. to sec. amine]

| Catalyst combination | Catalyst Mol percent relative to monomeric formaldehyde | Relative viscosity, $\eta_r$ |
|---|---|---|
| (a) Triethylamine/piperidine | 0.05/0.05 | 0.95 |
| ____do____ | 0.1/0.1 | 0.90 |
| (b) Triethylamine/di-n-butylamine | 0.05/0.05 | 1.0 |
| ____do____ | 0.1/0.1 | 1.1 |
| ____do____ | 0.02/0.02 | 1.0 |

*Example 4*

600 g. industrial paraformaldehyde are reacted with 270 g. phosphorus pentoxide and some paraffin oil 3 hours at 85–130° C. with stirring and exclusion of oxygen. The resulting pyrolysis gases are purified as under Example 1.

Seven mol of the formaldehyde thus purified are conducted into a reaction vessel during one hour containing 4000 ml. of a hexane fraction and a catalyst consisting of triethylamine/di-n-butylamine in the ratio of 1:1, with changing polymerization temperature. As the following table shows, the resulting molecular weight during rapid reaction is practically independent of the polymerization temperature.

TABLE IV
[Variation of polymerization temperature while the ratio of tert. to sec. amine remains constant]

| Catalyst No. | Catalyst combination | Catalyst Concentration, mol percent | Poly Temp., ° C. | Yield, percent | Relative viscosity, $\eta_r$ |
|---|---|---|---|---|---|
| 1 | Triethylamine/di-n-butylamine | 0.1/0.1 | +10 | 97.3 | 1.1 |
| 2 | Triethylamine/di-n-butylamine | 0.1/0.1 | +20 | 97 | 0.90 |
| 3 | Triethylamine/di-n-butylamine | 0.1/0.1 | +35 | 92 | 1.1 |

*Example 5*

600 g. industrial paraformaldehyde are reacted with 270 g. phosphorus pentoxide and some paraffin oil 3 hours at 85–130° C. with stirring and exclusion of oxygen. The resulting pyrolysis gases are purified as under Example 1.

The formaldehyde thus purified is conducted during 1 hour in increasing amounts into a reaction vessel containing 4000 ml. of a hexane fraction and a catalyst consisting of triethylamine/di-n-butylamine in the ratio of 1:1. The polymerization temperature is kept at 20° C. As the following table shows, the molecular weight does not change, even with a high content of solids.

TABLE V
[Variation of the solids content with a constant ratio of tert. to sec. amine]

| Catalyst No. | Catalyst Combination | Catalyst concentration, mol percent | Added HCHO, g. | Yield, percent | Relative viscosity, $\eta_r$ |
|---|---|---|---|---|---|
| 1 | Triethylamine/di-n-butylamine | 0.1/0.1 | 120 | 100 | 0.8 |
| 2 | | 0.1/0.1 | 180 | 98 | 0.9 |
| 3 | | 0.1/0.1 | 210 | 97 | 0.9 |
| 4 | | 0.1/0.1 | 240 | 100 | 0.9 |
| 5 | | 0.1/0.1 | 300 | 95 | 1.1 |

*Example 6*

600 g. industrial paraformaldehyde are reacted with 270 g. phosphorus pentoxide and some paraffin oil 3 hours at 85–130° C. with stirring and exclusion of oxygen. The resulting pyrolysis gases are purified as under Example 1.

Seven mol of the formaldehyde thus purified are delivered during 30–120 minutes to a reaction vessel containing 4000 ml. of a hexane fraction and a catalyst consisting of triethylamine/di-n-butylamine in the ratio of 1:1. As the following table shows, the chain length of the polymer is practically independent of the time during which polymerization occurs.

TABLE VI
[Variation of the speed of polymerization while the ratio of tert. to sec. amines remains constant]

| Catalyst No. | Catalyst combination | Catalyst concentration, Mol percent | Polymerization time in mins. | Yield | Relative viscosity, $\eta_r$ |
|---|---|---|---|---|---|
| 1 | Triethylamine/di-n-butylamine | 0.1/0.1 | 30 | 90 | 1.1 |
| 2 | | 0.1/0.1 | 40 | 95 | 0.9 |
| 3 | | 0.1/0.1 | 60 | 97 | 0.9 |
| 4 | | 0.1/0.1 | 120 | 94 | 1.1 |

From the foregoing description, one skilled in the art can easily ascertain the eccentrial characteristics of this invention, and without departing from the spirit and scope thereof, can make various changes and modifications of the invention to adapt it to various usages and conditions. Consequently, such changes and modifications are properly, equitable, and intended to be, within the full range of equivalence of the following claims.

What is claimed is:

1. In a process for the production of polyoxymethylene having a uniform molecular weight by the solution polymerization of formaldehyde monomer, the improvement comprising: carrying out the polymerization in a solution of an organic solvent which dissolves no more than 3% of the formaldehyde monomer, said solution having dissolved therein 0.0001 to 0.5 molar percent of the formaldehyde monomer and a mixed catalyst comprising a tertiary amine selected from the group consisting of trimethylamine, triethylamine, tri-n-butylamine, tri-i-amylamine, tri-n-octylamine, 1,3-bis-(dimethylamino propane, pyridine, the piperidine salt of dimethyl-dithiocarbamic acid, triethanolamine, hexamethylene-tetramine, tetra-methylene-diamine, tetraethyl-methylene-diamine and N-dimethyl-N'-diethyl-ethylene-diamine with another amine selected from the group consisting of piperidine, dimethylamine, diethylamine, dipropylamine, dibutylamine, diethanolamine, methylamine, ethylamine, propylamine, butylamine, cyclohexylamine, ethylene-diamine, secondary butylamine, tertiary butylamine, monoethanolamine, N,N' - dimethyl - ethylene - diamine, N,N'-dihexyl-octane-diamine, N - ethyl - N' - octyl-decane-diamine, hexane-diamine-(1,6), propane-diamine-(1,3), and mixtures thereof wherein the molar ratio of said tertiary amine group to said other amine group varies from 1 to 3.

2. Process as defined by claim 1 wherein the solvent contains from 0.004 to 0.8% by weight of said mixed catalyst.

References Cited

UNITED STATES PATENTS

| | | | |
|---|---|---|---|
| 2,768,994 | 10/1956 | MacDonald | 260—67 |
| 2,828,286 | 3/1958 | MacDonald | 260—67 |
| 2,841,570 | 7/1958 | MacDonald | 260—67 |
| 3,151,100 | 9/1964 | Richtzenhain et al. | 260—67 |
| 3,173,894 | 3/1965 | Hermann et al. | 260—67 |

WILLIAM H. SHORT, *Primary Examiner.*

L. MILLER, *Assistant Examiner.*